Feb. 24, 1959     D. W. HARLING     2,875,323
OUTDOOR LIGHTING LUMINAIRE
Filed Jan. 28, 1955     3 Sheets-Sheet 1
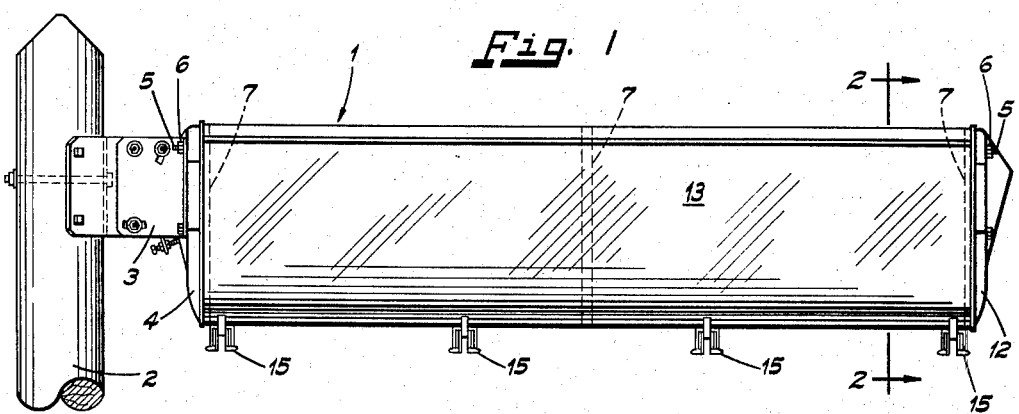
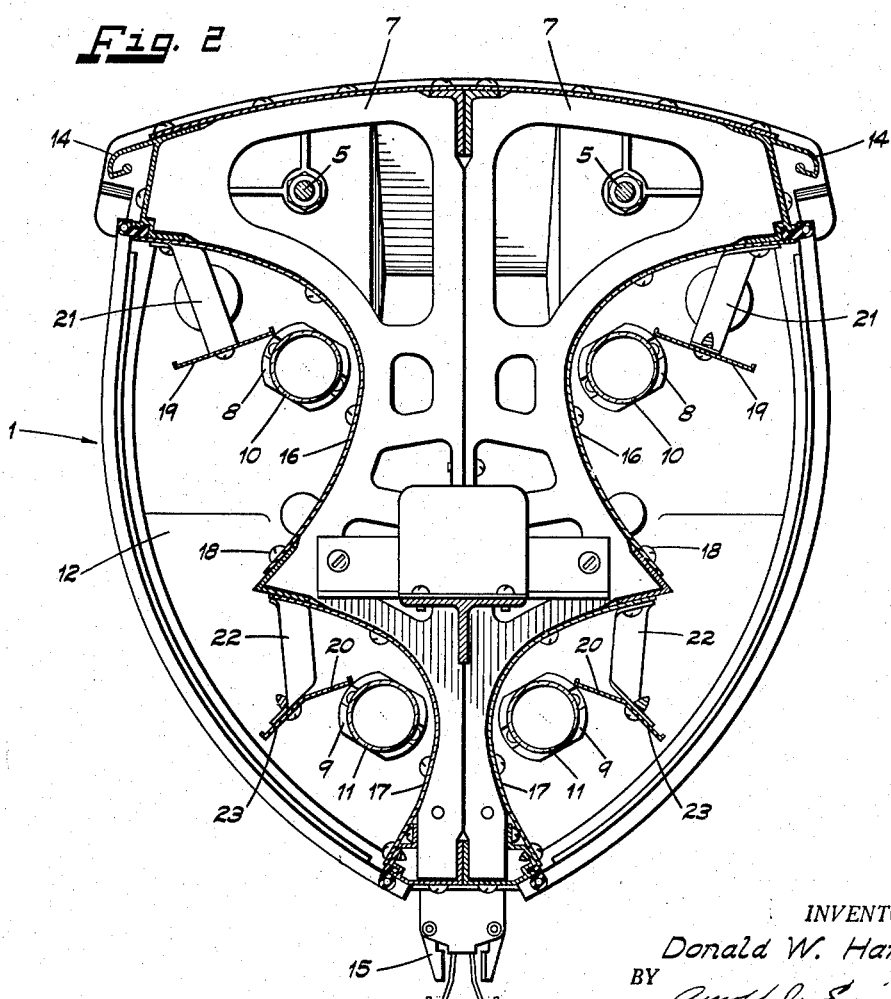
INVENTOR.
Donald W. Harling
BY
Attorney

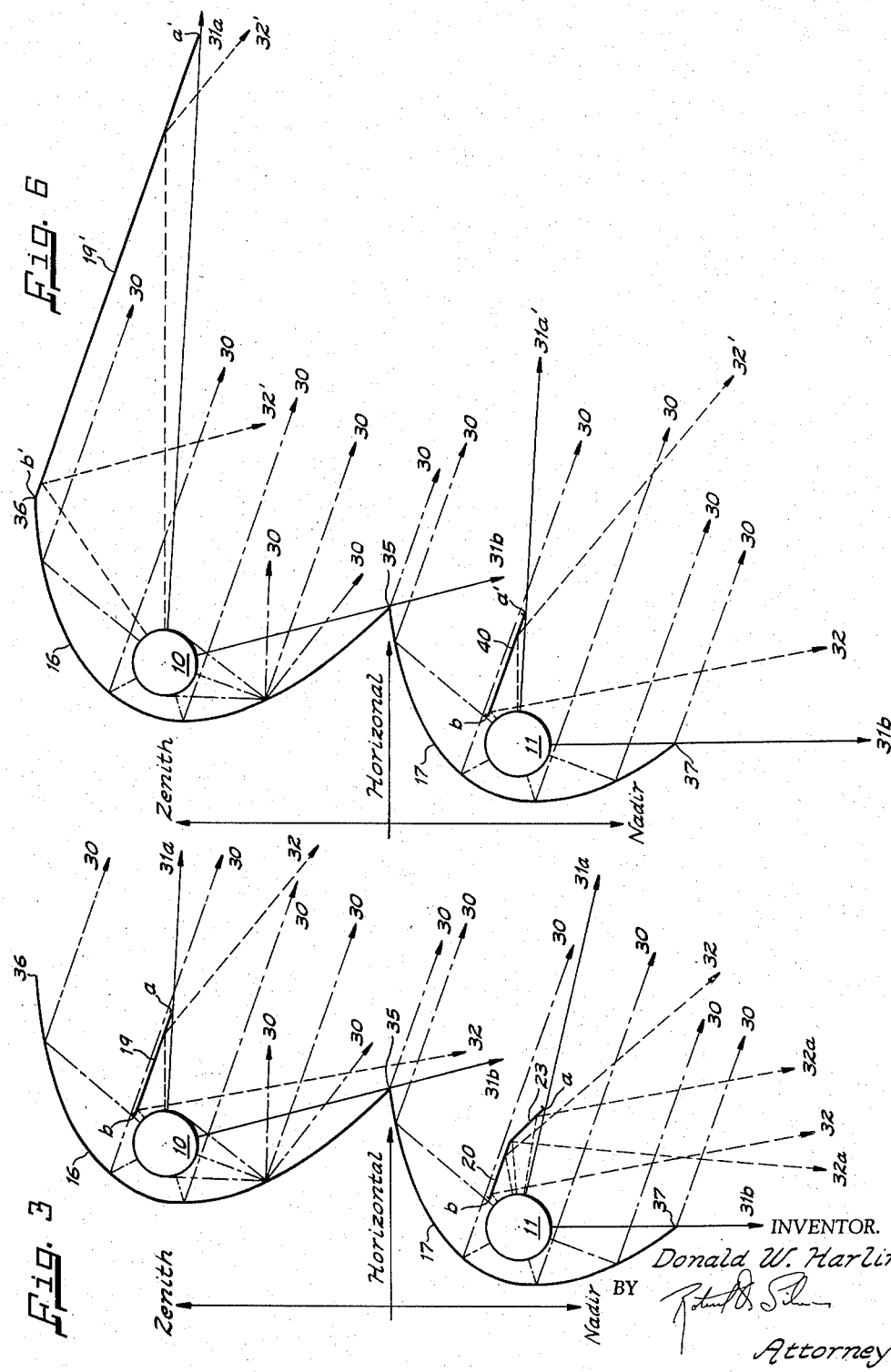

INVENTOR.
Donald W. Harling

United States Patent Office 2,875,323
Patented Feb. 24, 1959

2,875,323

OUTDOOR LIGHTING LUMINAIRE

Donald W. Harling, Milwaukee, Wis., assignor to McGraw-Edison Company, a corporation of Delaware Application January 28, 1955, Serial No. 484,703

7 Claims. (Cl. 240—25)

The present invention pertains to outdoor lighting, and more particularly pertains to an improved fluorescent or other lighting luminaire having an elongated light source especially adaptable for outdoor use, such as street lighting, parking area and airport ramp lighting.

In recent years the use of fluorescent luminaires for outdoor lighting has become increasingly popular, especially for installations which require a high candlepower lighting without accompanying glare caused by undue brightness of a particular light source. This is especially true for street lighting installations, where glare introduces additional hazards to night driving, especially when pavements are wet. In addition, contrast in brightness materially reduces the capacity to discern silhouettes of persons or vehicles in the path of a motorist.

The use of relatively large light sources provided by fluorescent lamps materially decreases glare, while offering additional background lighting, which provides a means for discerning silhouettes and also adds to the commercial aspects of business properties, along with reducing the so-called "tunnel effect" produced by driving along a roadway lighted by a series of point source incandescent lamps having little or no diffusive control. It will be obvious that any means for controlling or diffusing brightness or glare in incandescent luminaire becomes quite expensive through the use of additional reflectors, deflectors and precision molded refractor glassware.

The American Standards Association in cooperation with the Illuminating Engineering Society has set forth modern acceptable practices for street lighting, and in the joint publication entitled "American Standard Practice for Street and Highway Lighting," approved February 27, 1953. Luminaire light distribution has been classified in section 2 of this publication, and the lateral light distribution is classified into five basic types.

It is one of the objects of the present invention to provide a fluorescent street lighting luminaire that conforms to accepted classification of both vertical and lateral light distribution eliminating the need for expensive refractor glassware, and which luminaire further provides ample lighting without the disadvantage of overbrightness or glare caused by relatively smaller conventional light sources used in street and other outdoor lighting.

The present invention contemplates the use of simplified reflectors and auxiliary reflectors or deflectors to obtain accepted light distribution, and further takes maximum advantage of the candlepower emitted from the light source of said luminaire.

It is another object of the present invention to provide a fluorescent luminaire having at least one direction of light transmission, and using a plurality of fluorescent or other cylindrical elongated lamps in parallel relationship, and which lamps are individually provided with a specular reflector and auxiliary reflecting means, such as a deflector to obtain the most desirable light distribution pattern in both a lateral and vertical direction without the necessity for using refracting glassware.

In the drawings:

Fig. 1 is a front elevational view of the luminaire shown mounted on a conventional pole or standard elevated from ground level.

Fig. 2 is a sectional view taken on lines 2—2 of Fig. 1 with the cover members being removed therefrom.

Fig. 3 is a diagrammatic profile view of the optical system of the luminaire, illustrating the light ray pattern emitted from one side of the luminaire.

Fig. 6 is a view similar to Fig. 3 showing an alternative type of structure.

Figure 4:
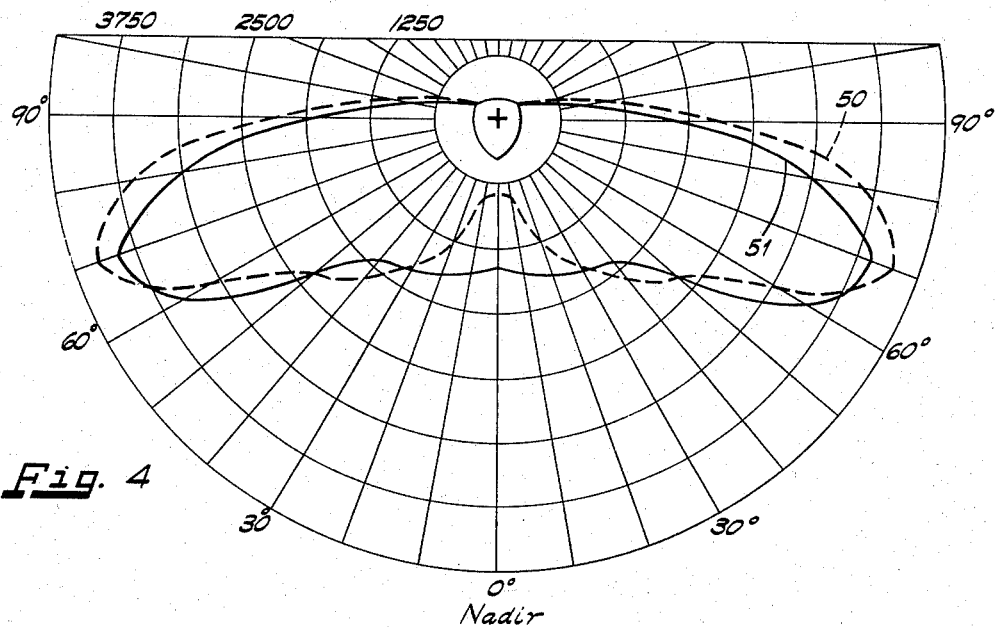
Fig. 4 is a vertical candlepower distribution curve illustrating the comparative vertical candle power distribution of two embodiments of the present luminaire.

Referring particularly to Figs. 1 and 2, the luminaire is denoted generally by the reference numeral 1 and may be attached to a conventional ornamental street lighting pole or standard 2 by means of a bracket 3. The bracket 3 is more fully described and claimed in the copending application, Serial No. 484,804, filed on January 28, 1955, by Donald W. Harling, and assigned to the same assignee as is the present invention. The particular bracket shown permits the luminaire to be inclined angularly from the horizontal to permit greater lateral candlepower distribution in a direction parallel with the elongated light source. The present invention contemplates the support of the luminaire in a horizontal manner extending laterally outwardly from the pole 2, as shown, or when slightly modified, to be hung from a vertical object such as a building with its longitudinal axes paralleling the plane of the building (not shown). In the latter installation, it will be apparent that only one side of the luminaire is required, and utilizes a backing plate in abutting engagement with the building wall. This modification is particularly described and claimed in copending application Serial No. 484,805, filed on January 28, 1955 by Donald W. Harling, and is also assigned to the same assignee as is the present invention. The latter described embodiment also has particular value in use for ramp lighting of airports and the like.

The bracket 3 is fastened directly to the end cover casting 4, engaging the threaded extending portions of the tie rods 5 by means of nuts 6 threaded thereon. A plurality of bulkheads 7 are provided in spaced-apart relationship along the longitudinal axis of the luminaire 1. The end cover 40 also provides means for supporting the sockets 8 and 9, which electrically engage the opposite ends of fluorescent lamps 10 and 11, respectively. The lamps 10 and 11 and their respective sockets are supported at their opposite ends by the cover casting 12. Plastic cover assemblies 13 are provided for either side of the luminaire and are hingedly supported from the hinge member 14 at the top of the luminaire for ease in permitting access and removal of the lamps and other maintenance functions. A series of latches 15 are provided for holding the cover in closed relationship with the luminaire. The covers are preferably transparent and may be manufactured of an acrylic resin. A moistureproof seal is provided with gaskets coextensive with the length of the cover (not shown).

Referring especially to Fig. 2, it will be seen that the lamps 10 and 11 on either side of the luminaire are provided with individual reflectors 16 and 17, respectively. The reflectors may be fabricated from a continuous stamped member, as shown, or may be individually stamped to the desired parabolic configuration. The parabolic reflectors 16 and 17 are a material capable of taking a specular finish for highest reflecting quality, and are substantially coextensive with the longitudinal axis of the luminaire 1. It is preferable to use self-tapping screws 18 for securing the reflectors to the individual bulkheads 7 and end covers 4 and 12. Appropriate auxiliary reflectors or deflectors 19 and 20 are suspended from hangers 21 and 22 for purposes hereinafter described.

The hangers are preferably fabricated from thin sheet metal and lie in a plane substantially normal to the longitudinal axis of the luminaire in order to minimize any interception of light rays.

It is also to be noted that the lower auxiliary reflectors 20 may be formed to bend inwardly towards the lamp 11 to provide an additional reflecting portion 23 for purposes hereinafter described.

Although, the present invention is described with particular regard to a fluorescent luminaire, it is within the scope of the invention to utilize the optical structure in connection with any luminaire having an elongated light source, such as mercury vapor lamps or elongated cylindrical incandescent lamps.

Figure 5:
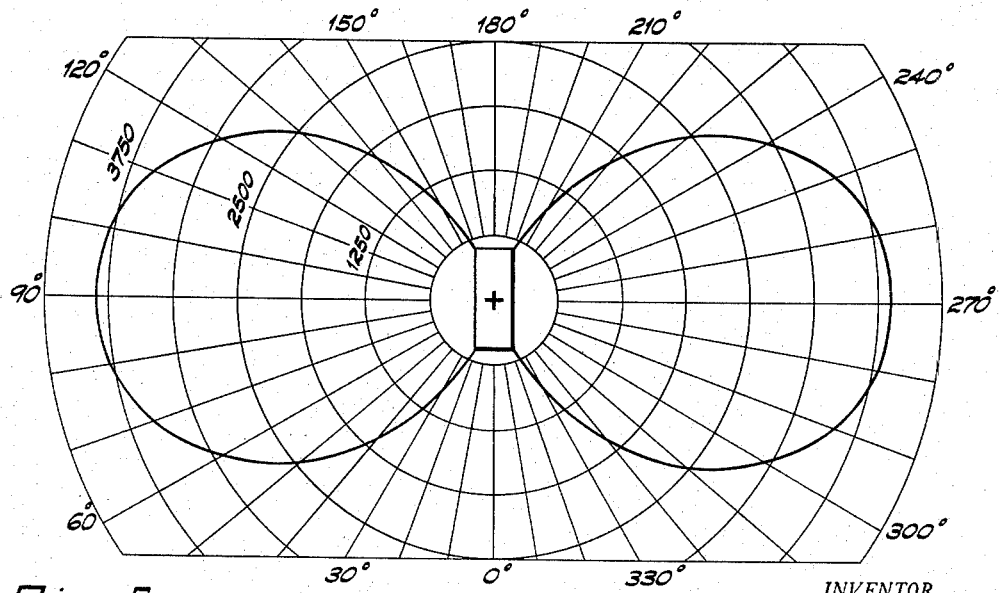
Fig. 5 is a lateral candlepower distribution curve of the light emitted from the present luminaire.

Attention is now directed to the diagrammatic views of Figs. 3, 4 and 5, which illustrate the preferred embodiment of the present invention with respect to both the vertical and horizontal candlepower distribution of the luminaire. As has been described previously, the luminaire has been designed with particular attention to its use for street lighting according to the acceptive practice as established by the Illuminatinng Engineering Society in conjunction with the American Standards Association, and further provides the correct candlepower distribution in a new and improved manner not heretofore accomplished by existing fluorescent luminaires. One of the main disadvantages to existing fluorescent luminaires used for outdoor lighting has been the fact that these luminaires generally provide two fluorescent lamps for obtaining the necessary candlepower, in the desired lateral direction, with these lamps being positioned in closely spaced relationship within the confines of a single parabolic reflector. It will be obvious, that because of the close proximity of the lamps, one of the lamps will be in the direct intercepting path of the beams or rays emanating from the other lamp within a wide angular range.

The present invention, in contrast, contemplates the use of a reflector of substantially the same amount of material as heretofore used, but which provides individual parabolic reflective portions for each lamp. In addition, it will be apparent from Figs. 2 and 3 that the directrix of each reflector is inclined from the vertical to provide parallel reflected light rays at a preferred angle, said angle being established by accepted practice for most effective lighting.

It is well established practice, as is particularly outlined in the joint publication heretofore mentioned, to project or distribute light at the maximum candlepower at angles between 70° and 77° from the vertical plane taken transversely through the luminaire. It will be obvious that any light rays directed above the horizontal are, for all purposes, wasted. The luminaire of this invention provides its main candlepower beam at an angle of 70° which is practically ideal for even light distribution with a series of complementary street lights distributed along a roadway. Furthermore, the luminaire provides a minimum of areas where light is reflected. It is well understood that each time light hits a reflector there is a 15% light loss, and it is obviously desirable to use as much direct light as possible to take advantage of the maximum candlepower distributed from the light source.

As far as lateral distribution of light is concerned, the aforementioned publication illustrating the accepted practice classifies the light into four major types. The present luminaire is basically a type I luminaire with a comparatively wider beam at street level. This may be seen with reference to Fig. 5. By tilting the lamp upwardly, as described in the copending application, Serial No. 484,804, a type IV light distribution may be approximated, which type has a preferred lateral width of 60° with an acceptable range of 50° or wider. The type IV distribution is intended for side-of-road mounting, and is generally used for roadway widths, which are relatively wide, and for business districts where it may be desirable to direct more sideward and upward light to the building fronts, thereby lessening the brightness contrast along the street and increasing its general attractiveness. Type I lateral distribution is a two-way lateral distribution having the vertical plane of maximum candlepower parallel with the curb line. The light distribution is similar on both sides of this vertical reference plane, and is generally applicable to a luminaire location near the center of a roadway. It will be obvious that to widen the relative width of the main candlepower beam is desirable practice. The accepted width is at least 15° on either side of the reference line. However, it is to be noted that these standards have been particularly set down for use with incandescent lighting, which requires a relatively expensive refractor in combination with a substantially circular light source. The relatively long and large light source provided by fluorescent lamps offers the advantage of wider lateral distribution at the road surface without the necessity of providing expensive refractors.

The fluorescent luminaires used heretofore for street lighting have had another grave disadvantage in that a relatively dark or shaded portion or penumbra occurs directly below the luminaire because certain supporting metallic portions of the luminaire frame assembly project outwardly transversely of the luminaire creating a large cutoff angle shielding the light rays from the projection directly below the luminaire. The present invention contemplates the optimum arrangement of inclined reflectors and auxiliary reflectors, or deflectors, to cast the light on the roadway in a uniform pattern when installed with complementary, spaced-apart luminaires on either side of the street.

Referring to the diagram of Fig. 3, it will be seen that the reflectors 16 and 17 are preferably angularly disposed from the vertical at an angle to provide the preferred angle of inclination of parallel reflected light rays designated by the dot-dash lines bearing the reference numeral 30. For purposes of explanation, the preferred angle of the present invention is 70° from the vertical, although deviations from this angle may be made without departing from the scope of the present invention. As stated previously, it is the preferred practice to take advantage of the direct rays from the fluorescent lamps as much as possible. The direct rays of the present luminaire have been designated by the solid lines bearing the reference numeral 31. Rays emanating from the auxiliary reflectors, or deflectors 19 and 20, respectively, have been designated by the dotted lines bearing the reference numeral 32.

It will be apparent that it is the preferred practice to position the axis taken through the center line of each of the lamps 10 and 11 to be substantially coincident with the focal axis of the parabolic reflectors 16 and 17, respectively. Thus, any of the parallel reflected light rays 30 will be directed at the preferred inclined angle, inasmuch as the entire optical assembly has been physically declined with the directrix of each parabolic reflector being so inclined from the vertical. Another advantage to arranging the lamps 10 and 11, with the upper lamp 10 being placed laterally outwardly from the vertical axis, is that this position provides a greater number of direct rays 31 to be directed inwardly below the lamp to provide an even distribution of light whether the light is observed directly below the lamp or laterally away from the lamp on either side thereof.

It will be apparent from Fig. 3 that the only limitation of the projection of direct rays 31 in any angular direction is determined by the cutoff edges of the reflectors 16 and 17 and the cutoff edges of the auxiliary reflectors or deflectors 19 and 20. Thus, the direct rays are preferably held within the angular range defined by the solid lines 31a and 31b relative to each of the lamps 10 and 11. As has heretofore been stated, it is undesirable to permit the direct rays to be projected above the horizontal, where such light would be wasted. Thus, with reference to the upper lamp 10, as shown in Fig. 3, the upper angle of cutoff for the direct ray 31a is determined by the outer edge "a" of the auxiliary reflector 19. It will be obvious, that it is the preferred practice to provide the deflector 19 with a flat reflecting surface lying in a plane substantially parallel to the plane of the reflected rays 30, as this practice will minimize interception of the parallel reflected rays 30. The remaining angular portion of the direct rays 31 is determined by the lower edge 35 of the reflector 16 which acts as a cutoff or shield for any direct rays angularly inwardly of the direct ray 31b.

The cutoff edge "b" of the auxiliary reflector or deflector 19, limits the profile width of the deflector to a point lying in a plane tangential with the outer light emitting surface of the lamp 10, which tangential plane is preferably parallel with the angle of the direct ray 31b. It will be obvious that the auxiliary reflector 19 may be positioned with the cutoff edge "b" intersecting the reflector 16. That is, the reflector 16, itself, may be flattened at its upper edge 36, as shown in Fig. 6, with the flat surface 19' extending to point a' and being parallel with the reflected rays 30. However, the preferred practice, as shown in Fig. 3, permits a maximum number of reflected rays 30 to be directed at the preferred angle, rather than downwardly, as shown by the dotted lines 32, which designate the rays reflected from the auxiliary reflector, or deflector 19. It will be obvious that as the auxiliary reflector 19 is positioned physically closer to the reflector 16, the profile width determined by the edge "a" will have to be extended accordingly to intercept a comparatively greater number of direct rays from projecting above the horizontal.

The upper cutoff edge 36 of the reflector 16 is determined by economical practices incident to manufacture of the luminaire. To extend the cutoff edge 36 beyond the desired point would require a relatively larger and costlier luminaire.

The lower cutoff edge 37 of the luminaire is preferably limited in dimension to its interception by a vertical plane passing through the center of the lower lamp 11. This, again, is a matter of choice, as the reflector 17 may be cut back, if so desired, to permit a greater portion of direct rays 31b to be directed inwardly and below the luminaire. However, the cutting back of the cutoff edge 37 beyond the vertical would sacrifice a greater portion of the reflected light depicted by the rays 30. Instead, it is contemplated by the preferred embodiment of the present invention to form the lower auxiliary reflector, or deflector 20 in the manner shown by the solid lines in Fig. 3, with the portion 23 being formed to bend downwardly and inwardly to redirect reflected light to the rays 32a, which project inwardly and below the luminaire.

However, if it is so desired, the deflector may be formed in the same manner as the upper deflector 19 and extended laterally outwardly as shown by the portion 40 in Fig. 6. This will give substantially the same reflected rays as shown and described in connection with the deflector 19. The cutoff edge "a" of the auxiliary reflector 20 is again limited to a length intercepting the direct rays 31a and preventing the rays thereon from rising above the horizontal, whereas the edge "b" is limited by the plane drawn tangentially of the outer surface of the light source 11.

The effect of forming the lower auxiliary reflector, or deflector 20 with the angularly disposed portion 23 is graphically illustrated in the vertical candlepower distribution curve of Fig. 4. The curve denoted by the dotted lines 50 in Fig. 4 relates to the vertical candlepower distribution of the luminaire with the deflector 20 having a straight reflecting surface extended by the portion 40. It will be seen from the curve that there is comparatively little light directed below the luminaire. The curves of Fig. 4, are shown for purposes of illustration only, as a typical example of the possible light distribution of the luminaire 1. The candlepower values recorded on the curves were determined by using 6 ft. fluorescent lamps having a cool white color and rated at 5200 lumens per lamp.

By bending the deflector 20 to provide the solid line portion 23, the area directly below the luminaire is practically doubled in candlepower, as illustrated by the solid lines 51, to provide a uniform light distribution at the street level. It will be obvious, that the point of maximum candlepower denoted on the curves is somewhat lessened by the interception of certain of the direct rays 31 and reflected rays 30 caused by bending the lower auxiliary reflector or deflector 20 away from the position parallel with the reflected rays 30.

The lateral candlepower distribution of the two-way luminaire shown in the present drawings was taken in the cone of maximum candlepower and is illustrated in Fig. 5. The particular curve relates to the luminaire having the auxiliary reflector 20 bent to provide the portion 23. It will be seen that the two-way luminaire provides a lateral distribution approximating the type I distribution outlined in the aforementioned publication. However, the elongated light source provided by fluorescent lamps gives an even greater width to the conventional type I distribution, which is especially beneficial for center-of-road mounting with relatively large curb-to-curb widths.

It will be apparent that the two-way luminaire is substantially symmetrical at both sides of its longitudinal axis and that a single side portion may be utilized for airport ramp lighting or for any installations permitting the luminaire to be mounted directly on a vertical wall and not requiring light to be distributed in more than one direction. A backing plate (not shown) is provided in normal manufacture for mounting directly at the center line of the luminaire, utilizing bulkheads of substantially one-half the width of those shown in Fig. 2. Installations of this type are shown and described in the copending application, Serial No. 484,805.

It will be apparent that the present invention has provided a luminaire having an elongated light source, and preferably a fluorescent luminaire, that may be utilized effectively for street lighting and other outdoor lighting purposes, which luminaire is substantially glare-free because of its relatively large light source and which gives a desirable vertical and lateral light for candlepower distribution for uniform street lighting practice.

I claim:

1. A luminaire comprising a first and a second cylindrical light source each of extended length and in parallel spaced-apart relationship with one another, a first and a second parabolic reflector for each of said light sources, respectively, and having their respective focal axes each substantially coincidental with the longitudinal axis of its respective light source, the directrix of each of said reflectors being inclined at an angle intersecting a vertical plane taken through the longitudinal axis of said luminaire to provide parallel reflected light rays from each of said light sources at respective predetermined angles less than 90° measured above nadir, the cutoff edge of said first parabolic reflector being spaced from said first light source and intersecting a cutoff edge of said second reflector.

2. A luminaire comprising a first and a second cylindrical light source each of extended length and in parallel spaced-apart relationship with one another, a first and a second parabolic reflector for each of said light sources, respectively, and having their respective focal axes each substantially coincidental with the longitudinal axis of its respective light source, the directrix of each of said reflectors being inclined at an angle intersecting a vertical plane taken through the longitudinal axis of said luminaire to provide parallel reflected light rays from both of said light sources at a predetermined angle less than 90° measured above nadir, and auxiliary reflecting means for intercepting a portion of the direct rays from each of said light sources and redirecting said direct rays at an angle less than the angle of said parallel reflected rays measured above nadir, a plane intersecting the cutoff edges of said first parabolic reflector being spaced from said first light source and substantially parallel with the plane of the directrix of said first reflector and intersecting a cutoff edge of said second reflector, the opposite cutoff edge of said second reflector being intercepted by a vertical plane taken through said second light source.

3. A luminaire comprising a first and a second cylindrical light source each of extended length and in parallel spaced-apart relationship with one another, a first and a second parabolic reflector for each of said light sources, respectively, and having their respective focal axes each substantially coincidental with the longitudinal axis of its respective light source, the directrix of each of said reflectors being inclined at an angle intersecting a vertical plane taken through the longitudinal axis of said luminaire to provide parallel reflected light rays from both of said light sources at a predetermined angle less than 90° measured above nadir, and an auxiliary reflector for each of said light sources, respectively, said auxiliary reflectors each being spaced from its respective light source and reflector and having a substantially flat reflecting surface disposed adjacent to and above the horizontal axis of its light source and substantially parallel with the angle of said reflected light rays for intercepting a portion of the direct rays from said light source tending to go above horizontal and to redirect said direct rays at an angle less than the angle of said parallel reflected light rays measured above nadir, the said auxiliary reflector for said second cylindrical light source being further formed to bend inwardly towards said light source at a point laterally spaced therefrom to further redirect certain of said portion of said direct rays inwardly of and below said luminaire.

4. A luminaire comprising a first and a second elongated spaced light sources, a first parabolic reflector for said first light sources, and a second parabolic reflector for said second light source the directrix of each of said reflectors being substantially parallel with each other to provide parallel reflected light rays from each of said light sources, one cutoff edge of said first parabolic reflector intersecting a cutoff edge of said second parabolic reflector to form a reflector cutoff edge common to and in the parabola of each of said parabolic reflectors.

5. A luminaire comprising an upper and a lower cylindrical light source each of extended length and in spaced-apart relationship with one another, an upper and a lower parabolic reflector respectively for said upper and lower light sources having their respective focal axis each substantially coincidental with the longitudinal axis of its respective light source, the directrix of each of said reflectors being parallel and inclined at an angle to provide parallel reflected light rays from each of said light sources at respective predetermined angles less than 90° measured above nadir, the lower cutoff edge of said upper parabolic reflector intersecting the upper cutoff of said lower reflector to provide a cutoff point substantially common to the parabolic curves of each reflector.

6. A luminaire comprising a first and a second cylindrical light source each of extended length and in parallel spaced-apart relationship with one another, a first and a second parabolic reflector one each for said light sources, respectively, and having their respective focal axis each substantially coincidental with the longitudinal axis of its respective light source, a cutoff edge of said first parabolic reflector intersecting a cutoff edge of said second reflector to form a light cutoff point common to both parabolic reflectors, said common cutoff point being spaced horizontally outwardly from vertical planes through each of said light sources.

7. A luminaire comprising an upper and a lower cylindrical light source each of extended length and in spaced-apart relationship with one another, an upper and a lower parabolic reflector respectively for said upper and lower light source having their respective focal axis each substantially coincidental with the longitudinal axis of its respective light source, the directrix of each of said reflectors being parallel and inclined at an angle to provide parallel reflected light rays from each of said light sources at respective predetermined angles less than 90° measured above nadir, the lower cutoff edge of said upper parabolic reflector intersecting the upper cutoff edge of said lower reflector to provide a cutoff point substantially common to the parabolic curves of each reflector, and auxiliary reflecting means for interception and redirection of direct rays of light from emanating said upper and lower light sources and tending to go above the horizontal plane of the luminaire.

References Cited in the file of this patent
UNITED STATES PATENTS

| | | |
|---|---|---|
| 1,446,892 | Fay | Feb. 27, 1923 |
| 2,306,700 | Kantack | Dec. 29, 1942 |

FOREIGN PATENTS

| | | |
|---|---|---|
| 616,075 | Great Britain | Jan. 17, 1949 |
| 672,924 | Great Britain | May 28, 1952 |
| 913,281 | Germany | June 10, 1954 |

UNITED STATES PATENT OFFICE

CERTIFICATE OF CORRECTION

Patent No. 2,875,323　　　　　　　　　　　　　　　February 24, 1959

Donald W. Harling

It is hereby certified that error appears in the printed specification of the above numbered patent requiring correction and that the said Letters Patent should read as corrected below.

Column 7, lines 48 and 49, for "sources", each occurrence, read -- source --; line 50, after "source" insert a comma.

Signed and sealed this 23rd day of June 1959.

(SEAL)
Attest:

KARL H. AXLINE　　　　　　　　　　　　　　　　　ROBERT C. WATSON
Attesting Officer　　　　　　　　　　　　　　　　　Commissioner of Patents